US012046207B2

(12) United States Patent
Shiau et al.

(10) Patent No.: US 12,046,207 B2
(45) Date of Patent: Jul. 23, 2024

(54) DISPLAY DEVICE

(71) Applicant: Coretronic Corporation, Hsin-Chu (TW)

(72) Inventors: Tzeng-Ke Shiau, Hsin-Chu (TW); Chin-Lung Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/568,718

(22) Filed: Jan. 5, 2022

(65) Prior Publication Data

US 2022/0230596 A1 Jul. 21, 2022

(30) Foreign Application Priority Data

Jan. 19, 2021 (CN) ......................... 202110067479.0

(51) Int. Cl.
*G09G 3/34* (2006.01)

(52) U.S. Cl.
CPC ... *G09G 3/3413* (2013.01); *G09G 2320/0242* (2013.01)

(58) Field of Classification Search
None
See application file for complete search history.

(56) References Cited

U.S. PATENT DOCUMENTS

2012/0032871 A1* 2/2012 Leisten .................. H01Q 11/08 343/895
2012/0032971 A1 2/2012 Hansen et al.
2018/0284501 A1* 10/2018 Lin ...................... H10K 59/351
2020/0126498 A1* 4/2020 Li ........................ G09G 3/3607

FOREIGN PATENT DOCUMENTS

CN 102402937 4/2012
CN 110570811 12/2019
TW 201009803 3/2010
TW 202016911 5/2020

OTHER PUBLICATIONS

"Office Action of China Counterpart Application", issued on Jul. 20, 2023, p. 1-p. 7.

* cited by examiner

*Primary Examiner* — Yingchun He
(74) *Attorney, Agent, or Firm* — JCIPRNET

(57) ABSTRACT

A display device is provided. At least one base color of a red base color, a green base color, and a blue base color of the display device is formed by mixing at least two primary colors of the three primary colors. The display device of the invention may decrease the issue of color distortion.

9 Claims, 3 Drawing Sheets

DISPLAY DEVICE

CROSS-REFERENCE TO RELATED APPLICATION

This application claims the priority benefit of China application serial no. 202110067479.0, filed on Jan. 19, 2021. The entirety of the above-mentioned patent application is hereby incorporated by reference herein and made a part of this specification.

BACKGROUND OF THE INVENTION

Field of the Invention

The invention relates to an electronic device, in particular to a display device.

Description of Related Art

If the color coordinates of the three primary colors of the display device and the color coordinates of the three standard color points of a predetermined color space (such as sRGB, Adobe RGB, or DCI-P3) are not overlapped (color shift), then the color authenticity is deviated. When the three primary colors are distorted, other colors formed by mixing the three primary colors are also distorted, resulting in poor overall color performance of the display device.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in this "BACKGROUND OF THE INVENTION" section does not mean that one or more problems to be resolved by one or more embodiments of the invention was acknowledged by a person of ordinary skill in the art.

SUMMARY OF THE INVENTION

The invention provides a display device that may decrease the issue of color distortion.

Other objects and advantages of the invention may be further understood from the technical features disclosed in the invention.

In order to achieve at least one of the objects or other objects, an embodiment of the invention provides a display device. At least one base color of a red base color, a green base color, and a blue base color of the display device is formed by mixing at least two primary colors of the three primary colors.

Based on the above, the embodiments of the invention have at least one of the following advantages or effects. In an embodiment of the invention, at least one base color of the red base color, the green base color, and the blue base color of the display device is formed by mixing at least two primary colors of the three primary colors to correct the color shift, so that the color coordinates of the red base color, the green base color, and the blue base color conform to the color coordinates of the three standard color points of a predetermined color space (such as sRGB, Adobe RGB, or DCI-P3). Other colors (such as secondary colors) are formed by mixing colors using the three base colors to help decrease color shift. Therefore, the display device of an embodiment of the invention may decrease the issue of color distortion.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B"

component. Accordingly, the drawings and descriptions will be regarded as illustrative in nature and not as restrictive.

In an embodiment of the invention, the display device may include a self-luminous display device or a non-self-luminous display device. The self-luminous display device may include a light-emitting diode (LED) display device, a micro LED display device, a mini LED display device, or an organic light-emitting diode (OLED) display device, but is not limited thereto. The non-self-luminous display device may include a liquid crystal display device, but is not limited thereto.

Figure 1:
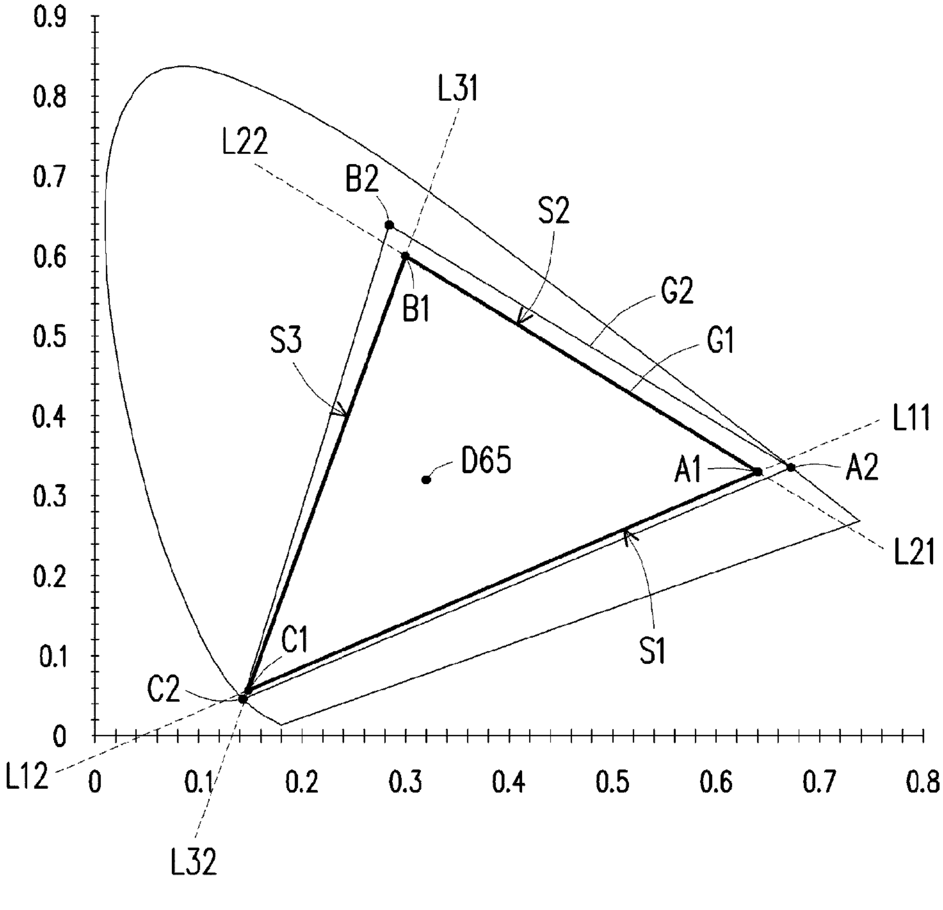
FIG. 1 is the CIE 1931 color space chromaticity diagram.

FIG. 1 is the CIE 1931 color space chromaticity diagram that marks a gamut G1 of sRGB and a gamut G2 of the display device according to an embodiment of the invention.

In FIG. 1, three standard color points A1, B1, and C1, and a white point D65 respectively represent the positions of red color, green color, blue color, and white color of sRGB in the CIE xy color coordinate system. In the sRGB color space, the color coordinates of red color (the standard color point A1) are (0.6400, 0.3300), the color coordinates of green color (the standard color point B1) are (0.3000, 0.6000), the color coordinates of blue color (the standard color point C1) are (0.1500, 0.0600), and the color coordinates of white color (the white point D65) are (0.3127, 0.3290). The range enclosed by the three standard color points A1, B1, and C1 connected to each other in pairs (see the triangular area framed by the thick solid line) represents the gamut G1 of sRGB. sRGB also defines the non-linear transformation between the intensity of the primary color and the actual stored numerical value. This curve is similar to the gamma response of a cathode ray tube (CRT) display device.

In FIG. 1, three color points A2, B2, and C2 respectively represent the positions of red color, green color, and blue color of the three primary colors of the display device according to an embodiment of the invention in the CIE xy color coordinate system. The three primary colors of the display device refer to the three primary colors of the display device before color correction (that is, the pure colors before color correction). The three primary colors before color correction are related to a light-emitting element, a light conversion layer, a light filter layer, or a combination thereof in the display device, but are not limited thereto. The light-emitting element may include a light-emitting diode, a micro light-emitting diode, a mini light-emitting diode, or an organic light-emitting diode, but is not limited thereto. The light conversion layer may include fluorescence, phosphor, quantum dot (QD), other suitable materials, or a combination of the above, but is not limited thereto. The light filter layer may include a light filter material capable of filtering light of different colors, but is not limited thereto. The wavelength range of the light-emitting element, the wavelength range of the light conversion layer, the light filter range of the light filter layer, or a combination of the above in the display device may be suitably selected to meet different requirements (such as wide gamut or high color authenticity, etc.)

Taking 256 gray levels as an example, the red color of the three primary colors of the display device refers to the color displayed by R (255), G (0), and B (0). R, G, and B represent red color, green color, and blue color, respectively. The numbers in parentheses represent grayscale values, wherein 0 in parentheses indicates the lowest brightness, and 255 in parentheses indicates the highest brightness. By analogy, R (255) means that the grayscale value of red color is 255, i.e., the brightest red color. G (0) means that the grayscale value of green color is 0, i.e., the darkest green color. B (0) means that the grayscale value of blue color is 0, i.e., the darkest blue color.

Similarly, the green color of the three primary colors refers to the color displayed by R (0), G (255), and B (0). R (0) means that the grayscale value of red color is 0, i.e., the darkest red color. G (255) means that the grayscale value of green color is 255, i.e., the brightest green color. The blue color of the three primary colors refers to the color displayed by R (0), G (0), and B (255). B (255) means that the grayscale value of blue color is 255, i.e., the brightest blue color.

In FIG. 1, the range enclosed by the three color points A2, B2, and C2 connected to each other in pairs (see the triangular area framed by the thin solid line) represents the gamut G2 of the display device according to an embodiment of the invention. In some embodiments, the wavelength range of the light-emitting element in the display device, the wavelength range of the light conversion layer, the light filter range of the light filter layer, other known means, or a combination of the above may be suitably selected to make the gamut of the display device larger than the gamut of sRGB. In addition, the color coordinates of the three color points A2, B2, and C2 may also be designed by the above means or a combination thereof to facilitate color mixing or color correction. For example, the color point A2 may fall between an extension line L11 of a first side S1 of the gamut G1 and an extension line L21 of a second side S2 of the gamut G1; the color point B2 may fall between an extension line L22 of the second side S2 of the gamut G1 and an extension line L31 of a third side S3 of the gamut G1; and the color point C2 may fall between an extension line L12 of the first side S1 of the gamut G1 and an extension line L32 of the third side S3 of the gamut G1.

It should be understood that, although FIG. 1 uses the sRGB color space as an example, according to different needs or applications, the sRGB color space may be replaced with other color spaces, such as Adobe RGB or DCI-P3, but is not limited thereto. That is, in other embodiments, the gamut of the three primary colors of the display device may be larger than the gamut of Adobe RGB or DCI-P3.

When the color coordinates of the three primary colors of the display device do not overlap with the color coordinates of the three standard color points in a predetermined color space (such as sRGB, Adobe RGB, or DCI-P3), the colors displayed by the display device may be deviated or distorted. In order to decrease the issue of deviation or distortion, in the present embodiment, at least one base color of the red base color, the green base color, and the blue base color of the display device is formed by mixing at least two primary colors of the three primary colors (that is, the pure colors before color correction) to correct the color shift, so that the color coordinates of the red base color, the green base color, and the blue base color conform to the color coordinates of the three standard color points of the standard color space (such as sRGB, Adobe RGB, or DCI-P3). For example, the color coordinates of the red base color, the green base color, and the blue base color are the color coordinates of the three standard color points in a standard color space (such as sRGB, Adobe RGB, or DCI-P3), and color mixing is performed using the three base colors to form other colors (such as secondary colors), thereby alleviating color shift. Therefore, the display device may decrease the issue of color distortion. Considering factors such as various errors and deviations, the color coordinates of the above three base colors are that the color coordinates of the three standard color points in the standard color space should include the two cases where the color coordinates of the three base colors are equal to or similar to (the color difference is less than 0.001) the color coordinates of the three standard color points in the standard color space.

It should be understood that, the red base color, the green base color, and the blue base color of the display device respectively refer to red color, green color, and blue color of the display device after color correction. After the color correction, at least one base color of the red base color, the green base color, and the blue base color is formed by mixing at least two primary colors of red color, green color, and blue color (referred to as the three primary colors) before the color correction. For example, at least one base color may be formed by mixing two primary colors of the three primary colors. Alternatively, at least one base color may be formed by mixing three primary colors (i.e., red color, green color, and blue color) of the three primary colors.

In detail, the at least two primary colors of the at least one base color include a main color (a color corresponding to the at least one base color) and a compensation color. For example, the red base color may be a combination of green color, blue color, or green color and blue color of the three primary colors mixed with red color of the three primary colors. At this time, red color of the three primary colors is the main color, and green color and blue color of the three primary colors are the compensation colors. Similarly, the green base color may be a combination of red color, blue color, or red color and blue color of the three primary colors mixed with green color of the three primary colors. At this time, green color of the three primary colors is the main color, and red color and blue color of the three primary colors are the compensation colors. Similarly, the blue base color may be a combination of red color, green color, or red color and green color of the three primary colors mixed with blue color of the three primary colors. At this time, blue color of the three primary colors is the main color, and red color and green color of the three primary colors are the compensation colors. In some embodiments, based on considerations such as color purity or color fine-tuning, the grayscale values of the compensation colors are 30% or less of the grayscale value of the main color. That is, the grayscale values of the compensation colors are less than or equal to 30% of the grayscale value of the main color. Taking the red base color as an example, if the grayscale value of red color of the three primary colors is 255, then the grayscale value of green color or blue color of the three primary colors does not exceed 76.5 (that is, 255*30%). In some other embodiments, the grayscale values of the compensation colors are 20% or less of the grayscale value of the main color. In some other embodiments, the grayscale values of the compensation colors are 10% or less of the grayscale value of the main color.

Figure 2:
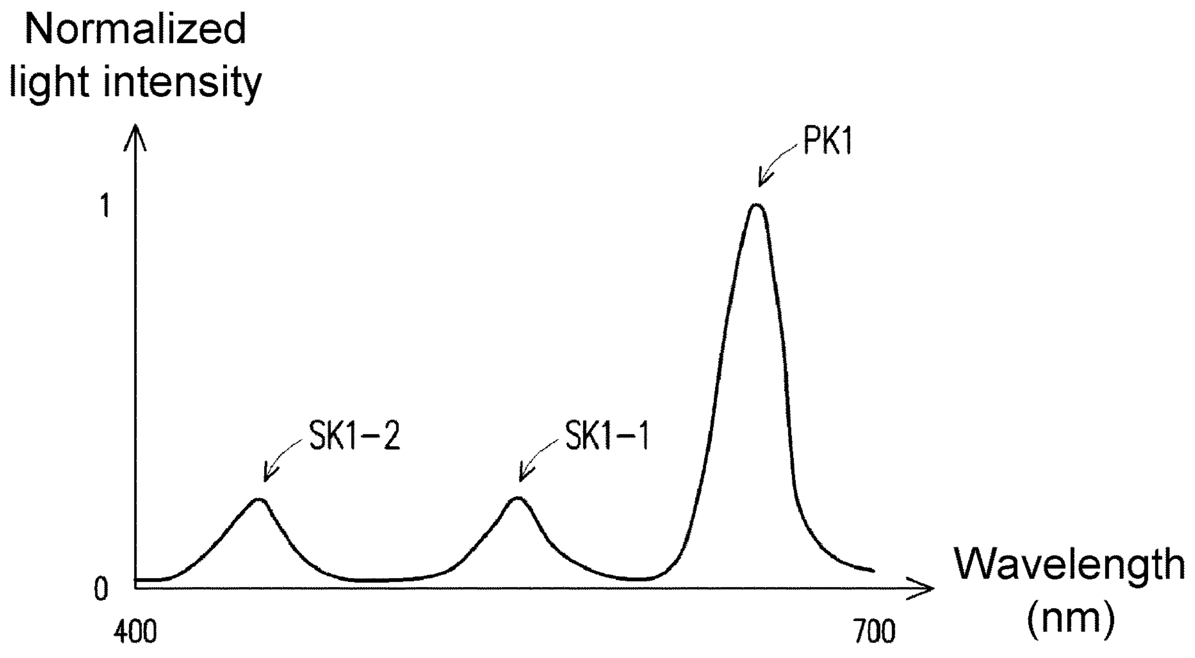
FIG. 2 to FIG. 4 are respectively a spectrum diagram of a red base color, a green base color, and a blue base color of a display device according to an embodiment of the invention.
Figure 3:
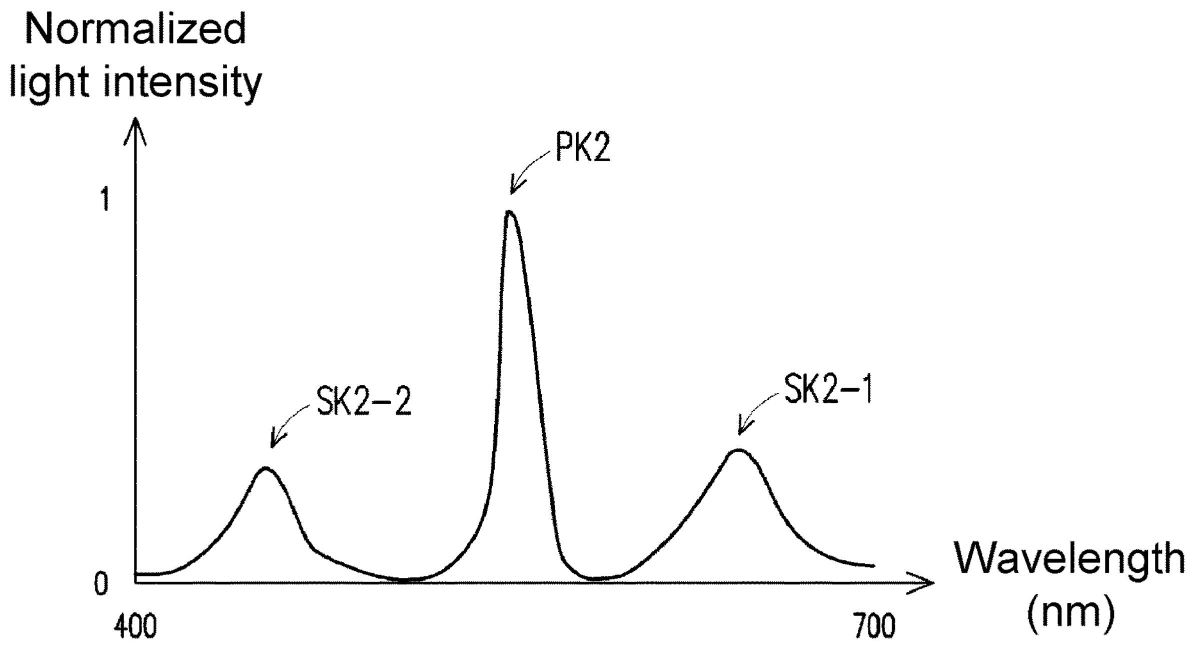
Figure 4:
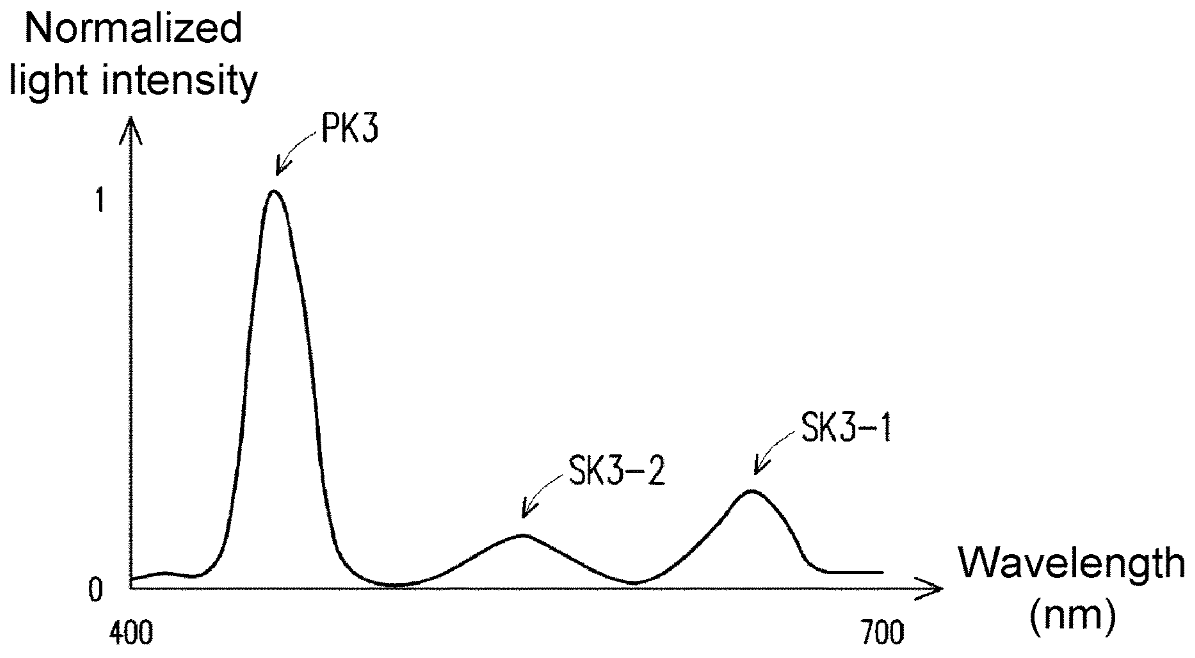

FIG. 2 to FIG. 4 are respectively a spectrum diagram of a red base color, a green base color, and a blue base color of a display device according to an embodiment of the invention.

Referring to FIG. 2, in the case where the red base color is formed by mixing red color, green color, or blue color of the three primary colors, the spectrum of the red base color may include one main peak PK1 and two sub-peaks SK1-1 and SK1-2. The wavelength of the main peak PK1 corresponds to red color of the three primary colors. For example, the wavelength of the main peak PK1 may fall within the range of 630 nm to 690 nm. In addition, the wavelengths of the two sub-peaks SK1-1 and SK1-2 correspond to green color and blue color of the three primary colors, respectively. For example, the wavelength of the sub-peak SK1-1 may fall within the range of 520 nm to 600 nm, and the wavelength of the sub-peak SK1-2 may fall within the range of 450 nm to 520 nm. In other embodiments, although not shown in the figures, the red base color may also be red color of the three primary colors mixed with green color or blue color of the three primary colors. At this time, the spectrum of the red base color may include one main peak PK1 and one sub-peak (such as the sub-peak SK1-1 or the sub-peak SK1-2).

Referring to FIG. 3, in the case where the green base color is formed by mixing red color, green color, or blue color of the three primary colors, the spectrum of the green base color may include one main peak PK2 and two sub-peaks SK2-1 and SK2-2. The wavelength of the main peak PK2 corresponds to green color of the three primary colors. For example, the wavelength of the main peak PK2 may fall within the range of 520 nm to 600 nm. In addition, the wavelengths of the two sub-peaks SK2-1 and SK2-2 correspond to red color and blue color of the three primary colors, respectively. For example, the wavelength of the sub-peak SK2-1 may fall within the range of 630 nm to 690 nm, and the wavelength of the sub-peak SK2-2 may fall within the range of 450 nm to 520 nm. In other embodiments, although not shown in the figures, the green base color may also be green color of the three primary colors mixed with red color or blue color of the three primary colors. At this time, the spectrum of the green base color may include one main peak PK2 and one sub-peak (such as the sub-peak SK2-1 or the sub-peak SK2-2).

Referring to FIG. 4, in the case where the blue base color is formed by mixing red color, green color, or blue color of the three primary colors, the spectrum of the blue base color may include one main peak PK3 and two sub-peaks SK3-1 and SK3-2. The wavelength of the main peak PK3 corresponds to blue color of the three primary colors. For example, the wavelength of the main peak PK3 may fall within the range of 450 nm to 520 nm. In addition, the wavelengths of the two sub-peaks SK3-1 and SK3-2 correspond to red color and green color of the three primary colors, respectively. For example, the wavelength of the sub-peak SK3-1 may fall within the range of 630 nm to 690 nm, and the wavelength of the sub-peak SK3-2 may fall within the range of 520 nm to 600 nm. In other embodiments, although not shown in the figures, the blue base color may also be blue color of the three primary colors mixed with red color or green color of the three primary colors. At this time, the spectrum of the blue base color may include one main peak PK3 and one sub-peak (such as the sub-peak SK3-1 or the sub-peak SK3-2).

It should be understood that although FIG. 2 to FIG. 4 respectively illustrate that the three base colors are each formed by mixing red color, green color, or blue color of the three primary colors, the number of colors mixed for each base color may be changed according to requirements, and is not limited thereto. In addition, the central wavelength or light intensity of each main peak or sub-peak in FIG. 2 to FIG. 4 is only an example, and may be changed according to requirements.

The following examples illustrate one of the implementations for correcting color shift of the display device. However, the numerical values listed in the example are for illustrative purposes only, and are not intended to limit the invention.

First, the three base colors are adjusted, so that the color coordinates of the red base color, the green base color, and the blue base color conform to the color coordinates of the three standard color points in a standard color space (such as sRGB, Adobe RGB, or DCI-P3). For example, the adjusted red base color is composed of R (255), G (2), and B (2); the adjusted green base color is composed of R (3), G (255), and B (3); and the adjusted blue base color is composed of R (2), G (1), and B (255).

Second, the white point is adjusted so that the white point of the display device is the white point in the standard color space, such as the white point D65 in the sRGB color space, but is not limited thereto. For example, the grayscale value of red color of the white point of the display device is the sum of the grayscale values of red color of the three base colors, the grayscale value of green color of the white point of the display device is the sum of the grayscale values of green color of the three base colors, and the grayscale value of blue color of the white point of the display device is the sum of the grayscale values of blue color of the three base colors. Therefore, the grayscale value of red color of the white point of the display device is (255+3+2), which is R (260); the grayscale value of green color of the white point of the display device is (2+255+1), which is G (258); and the grayscale value of blue color of the white point of the display device is (2+3+255), which is B (260). However, since the grayscale values of red color, green color, and blue color all may not exceed 255, R (260), G (258), and B (260) need to be reduced in the same proportion. For example, the maximum grayscale value 260 may be reduced to 255 by multiplying the maximum grayscale value (such as 260 for red color or blue color) by 255/260. For the rest of the colors, after multiplication by 255/260, white points composed of R (255), G (253), and B (255) may be obtained.

After the correct white point is found by adjustment, the grayscale values of red color, green color, and blue color of each of the three base colors are corrected, so that the grayscale values of red color, green color, and blue color of the white point calculated based on the corrected three base colors all do not exceed 255. For example, the corrected red base color is composed of R (250), G (2), and B (2); the corrected green base color is composed of R (3), G (250), and B (3); and the corrected blue base color is composed of R (2), G (1), and B (250). In this way, the grayscale values of red color, green color, and blue color of the white point calculated based on the corrected three base colors are 255, 253, and 255, respectively, which are the same as the adjusted white point. It may be known from the example that the white point of the display device satisfies at least one of the following: the grayscale value of red color of the white point (such as 255) is greater than the grayscale value of red color of the red base color (such as 250); the grayscale value of green color of the white point (such as 253) is greater than the grayscale value of green color of the green base color (such as 250); and the grayscale value of blue color of the white point (such as 255) is greater than the grayscale value of blue color of the blue base color (such as 250).

Next, the gamma curves of red color, green color, and blue color are adjusted. Then, the mixed colors of the standard color wheel are displayed on the display device one by one, and the displayed numerical value thereof is measured by a colorimeter. The smaller the difference between the displayed numerical value and the set value of the predetermined color, the more authentic the restored color. In this way, in art editing, the issue of inconsistency between the colors seen on the screen and the printed colors may be decreased. Using the above method to perform color correction on a plurality of display devices may not only decrease the issue of color distortion of each display device, but may also improve the consistency of the color performance of the display devices. Moreover, the three base colors are adjusted first, and then the white point is adjusted via the adjusted three base colors, then the grayscale values of the three base colors are adjusted via the adjusted white point, and color mixing is performed using the corrected three base colors to form other colors (such as secondary colors) to help decrease color shift and reduce the probability of distortion of other secondary colors due to distortion of the three base colors.

It should be understood that the above method of correcting the color shift includes adjusting the three color points A2, B2, and C2 in FIG. 1 toward the direction of the three standard color points A1, B1, and C1. However, when the color points are quite close to the corresponding standard color points, adjustment is no longer needed.

Based on the above, the embodiments of the invention have at least one of the following advantages or effects. In an embodiment of the invention, at least one base color of the red base color, the green base color, and the blue base color of the display device is formed by mixing at least two primary colors of the three primary colors to correct the color shift, so that the color coordinates of the red base color, the green base color, and the blue base color conform to the color coordinates of the three standard color points of a standard color space (such as sRGB, Adobe RGB, or DCI-P3). Other colors (such as secondary colors) are formed by mixing colors using the three base colors to help decrease color shift. Therefore, the display device of an embodiment of the invention may decrease the issue of color distortion.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of correcting color shift for display device, comprising:

adjusting color coordinates of three base colors of the display device to conform to color coordinates of three standard color points in a standard color space, wherein the three base colors are a red base color, a green base color, and a blue base color, wherein at least one base color of the red base color, the green base color, and the blue base color is formed by mixing at least two primary colors of three primary colors; and adjusting a white point of the display device to conform to a white point of the standard color space, wherein the white point of the display device satisfies at least one of the following:

a grayscale value of a red color component of the white point of the display device is a sum of grayscale values of red color components in the three base colors multiplied by 255 and then divided by a maximum grayscale value, a grayscale value of a green color component of the white point of the display device is a sum of grayscale values of green color components in the three base colors multiplied by 255 and then divided by the maximum grayscale value, a grayscale value of a blue color component of the white point of the display device is a sum of grayscale values of blue color components in the three base colors multiplied by 255 and then divided by the maximum grayscale value, wherein the maximum grayscale value is a maximum value among the sum of the grayscale values of the red color components in the three base colors, the sum of the grayscale values of the green color components in the three base colors and the sum of the grayscale values of the blue color components in the three base colors, after the white point is adjusted, the three base colors are corrected, wherein the grayscale value of the red color component of the white point is greater than a grayscale value of a red color component of a corrected red base color in the three base colors, wherein the grayscale value of the green color component of the white point is greater than a grayscale value of a green color component of a corrected green base color in the three base colors, wherein the grayscale value of the blue color component of the white point is greater than a grayscale value of a blue color component of a corrected blue base color in the three base colors.

2. The method of correcting color shift for display device of claim 1, wherein the at least one base color is formed by mixing a red color, a green color, and a blue color of the three primary colors.

3. The method of correcting color shift for display device of claim 1, wherein a spectrum of the red base color comprises one main peak and at least one sub-peak, a wavelength of the main peak corresponds to a red color of the three primary colors, and a wavelength of the at least one sub-peak corresponds to a green color or a blue color of the three primary colors.

4. The method of correcting color shift for display device of claim 1, wherein a spectrum of the green base color comprises one main peak and at least one sub-peak, a wavelength of the main peak corresponds to a green color of the three primary colors, and a wavelength of the at least one sub-peak corresponds to a red color or a blue color of the three primary colors.

5. The method of correcting color shift for display device of claim 1, wherein a spectrum of the blue base color comprises one main peak and at least one sub-peak, a wavelength of the main peak corresponds to a blue color of the three primary colors, and a wavelength of the at least one sub-peak corresponds to a red color or a green color of the three primary colors.

6. The method of correcting color shift for display device of claim 1, wherein the at least two primary colors of the at least one base color comprise a main color and a compensation color, and a grayscale value of the compensation color is 30% or less of a grayscale value of the main color.

7. The method of correcting color shift for display device of claim 1, wherein the color coordinates of the red base color, the green base color, and the blue base color are the color coordinates of three standard color points of SRGB, Adobe RGB, or DCI-P3.

8. The method of correcting color shift for display device of claim 1, wherein a gamut of the three primary colors of the display device is larger than a gamut of sRGB, Adobe RGB, or DCI-P3.

9. The method of correcting color shift for display device of claim 1, wherein the white point of the display device is a white point D65.

* * * * *